(12) United States Patent
Gauthier et al.

(10) Patent No.: US 6,993,590 B1
(45) Date of Patent: Jan. 31, 2006

(54) METHOD OF CREATING DATA STREAMS FOR USER-SPECIFIC USAGE DATA GATHERING SYSTEMS

(75) Inventors: Paul Andre Gauthier, Palo Alto, CA (US); Kevin A. Epstein, San Mateo, CA (US); Anshu Aggarwal, Foster City, CA (US)

(73) Assignee: Inktomi Corporation, Foster City, CA (US)

( * ) Notice: Subject to any disclaimer, the term of this patent is extended or adjusted under 35 U.S.C. 154(b) by 0 days.

(21) Appl. No.: 09/484,581

(22) Filed: Jan. 13, 2000

(51) Int. Cl.
    *G06F 17/00* (2006.01)

(52) U.S. Cl. .............................. 709/231; 705/1; 705/10
(58) Field of Classification Search .................... 705/1, 705/35, 54, 10, 52, 14; 709/224, 216, 200, 709/201, 226, 231; 700/108, 111
See application file for complete search history.

(56) References Cited

U.S. PATENT DOCUMENTS

| | | | |
|---|---|---|---|
| 5,611,049 A | 3/1997 | Pitts | |
| 6,052,730 A | * 4/2000 | Feliciano et al. | 709/225 |
| 6,085,234 A | 7/2000 | Pitts et al. | |
| 6,393,479 B1 | * 5/2002 | Glommen et al. | 709/224 |

FOREIGN PATENT DOCUMENTS

EP   0 801 487 A2  * 10/1997

OTHER PUBLICATIONS

Young, Deborah; Racing to next gen; Mar. 2001; Wireless Review v18n5 pp30–36; dialog copy pp. 1–4.*

* cited by examiner

*Primary Examiner*—Thomas A. Dixon
(74) *Attorney, Agent, or Firm*—Christopher J. Brokaw; Hickman Palermo Truong & Becker LLP

(57) ABSTRACT

A method and apparatus are provided for capturing and managing user-specific data, where the user-specific data contains information on the user's interaction with the Net. The method generally involves using a proxy to capture or cause to capture the user-specific data and then storing the user-specific data. The user-specific data may be used to customize the contents of electronic information delivered to the particular user.

72 Claims, 5 Drawing Sheets

METHOD OF CREATING DATA STREAMS FOR USER-SPECIFIC USAGE DATA GATHERING SYSTEMS

FIELD OF THE INVENTION

The present invention generally relates to data processing and, more specifically, to capturing, transmitting, and processing information about user Net usage.

BACKGROUND OF THE INVENTION

The Internet and World Wide Web (hereinafter the "Net") provide users with convenient access to information. The exponential growth of the Net has generated vast quantities of data that is available to users of the Net at the click of a mouse. However, an incidental but important consequence of the widespread use of the Net is the information created by users of the Net (hereinafter "user-specific usage data"). Users of the Net generate data by connecting to various locations (computers, applications, and files) comprising and connected to the Net. For example, user-specific usage data may take the form of requests that are transmitted by a user's web browser, on behalf of the user. User-specific usage data is also generated as the user interacts with web sites and applications linked to the Net. User-specific usage data reflects a user's interests, and therefore constitutes a potentially valuable source of market and demographic information.

Useful knowledge can be interpreted from the user-specific usage data to support and provide direction for e-business decisions. For example, the data can be mined for user profiles, subsequently used by businesses to customize their on-line advertisements of services and products to targeted segments of consumers. Other uses include but are not limited to customizing a user's interaction with a web site based on the user's profile. To illustrate, assume user G visits the Acme Book company web site, and the profile of user G indicates that G is an avid golfer, then Acme Book company may choose to send G a customized web page to include a list of books on the subject of golf. Still other uses of user profiles include but are not limited to sending political campaign advertising, public service announcements, or other solicitations to target segments of Net users.

A business can make strategic and tactical decisions based on the user-specific usage data derived from data generated by a Net user's interaction. For example, a Net user's pattern of interactions with different applications, files, and computers on the Net may reveal the user's preference for certain Net functions over competitor's Net functions. If a great many users exhibit similar preferences, and it is determined that the users are a target customer-base for a business, then the business may take appropriate action to better meet the needs of the target customer-base. For example, the business may modify its offerings of services and products or otherwise improve its Net site to enhance a user's interaction with the site.

As another example, a Net user's patterns of Net interactions may be helpful in attempting to predict what content the user may be interested in viewing and thus, the relevant Net pages of such content may be proactively made available to the user. To illustrate, suppose a user's Net interaction history includes visits to various Net sites featuring exclusive real estate, yachts, and private jets. Using inductive reasoning, one might hazard a guess that this particular user might be interested in receiving Net information featuring articles on the lives of the rich and famous.

Another illustration of useful knowledge that can be interpreted from the data generated by a Net user's Net interactions is the identification of a network of sites that represent complementary products and services. For example, the Net interaction habits of a customer segment that favors fine wine may be used to identify a group of companies of complementary products and services, which can collaborate and coordinate their offerings to that segment of wine connoisseurs.

The user-specific usage data gathered from the Net is also valuable to businesses that do not have an on-line presence. Any business may profit by making business decisions based on information on market trends and the demography of customer segments derived from the Net interaction generated data.

While user-specific usage data is potentially valuable, the challenge is knowing how to collect the user-specific usage data, what data to collect and, once the data is collected, how to organize, manipulate and mine the collected data to produce useful knowledge. Thus, there is a need for a system or mechanism that delivers on demand, actionable knowledge of Net user's Net interactions.

SUMMARY OF THE INVENTION

According to one aspect of the invention, a method is provided of capturing data about the Net interaction behavior of a user for the purpose of converting the data into useful knowledge on the user for use by businesses in marketing solutions and business decisions. In one embodiment, the method generally involves using a proxy, proxy cache, switch, router, or other network application or device through which user internet browsers or applications connect to internet servers (henceforth referred to by the class name 'proxy'), through which all users' requests pass, to collect or cause to collect all information created by the users.

The invention also encompasses an apparatus and a computer-readable medium that may be configured to implement the foregoing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for capturing and managing user-specific usage data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

In still other instances, certain specific terms are used by way of example, but the invention or any particular embodiment is not limited to implementation using structures or functions that are identified by such specific terms.

Functional Overview

A user-specific usage data gathering system is provided that includes one or more proxies. In the context of this application, a proxy refers to those network applications or appliances known as a proxy, proxy cache, switch, router, or other network application or device through which user internet browsers or applications connect to internet servers (generally referred to by the class name 'proxy'). Unlike Net servers, proxies generally do not only receive requests that are directed to content, applications, or control functions that they may possess. Rather, during a session in which a user is connected to the Internet through a proxy, that proxy receives most or all of that user's requests.

Proxies may include a cache. Generally, a cache is a system that stores recently retrieved data or applications in a high-speed memory storage area, and responds to requests for those data or applications by delivering the stored versions rather than retrieving and delivering versions from the original source of the data or application, which may be slow, unavailable, or distant.

Figure 1:
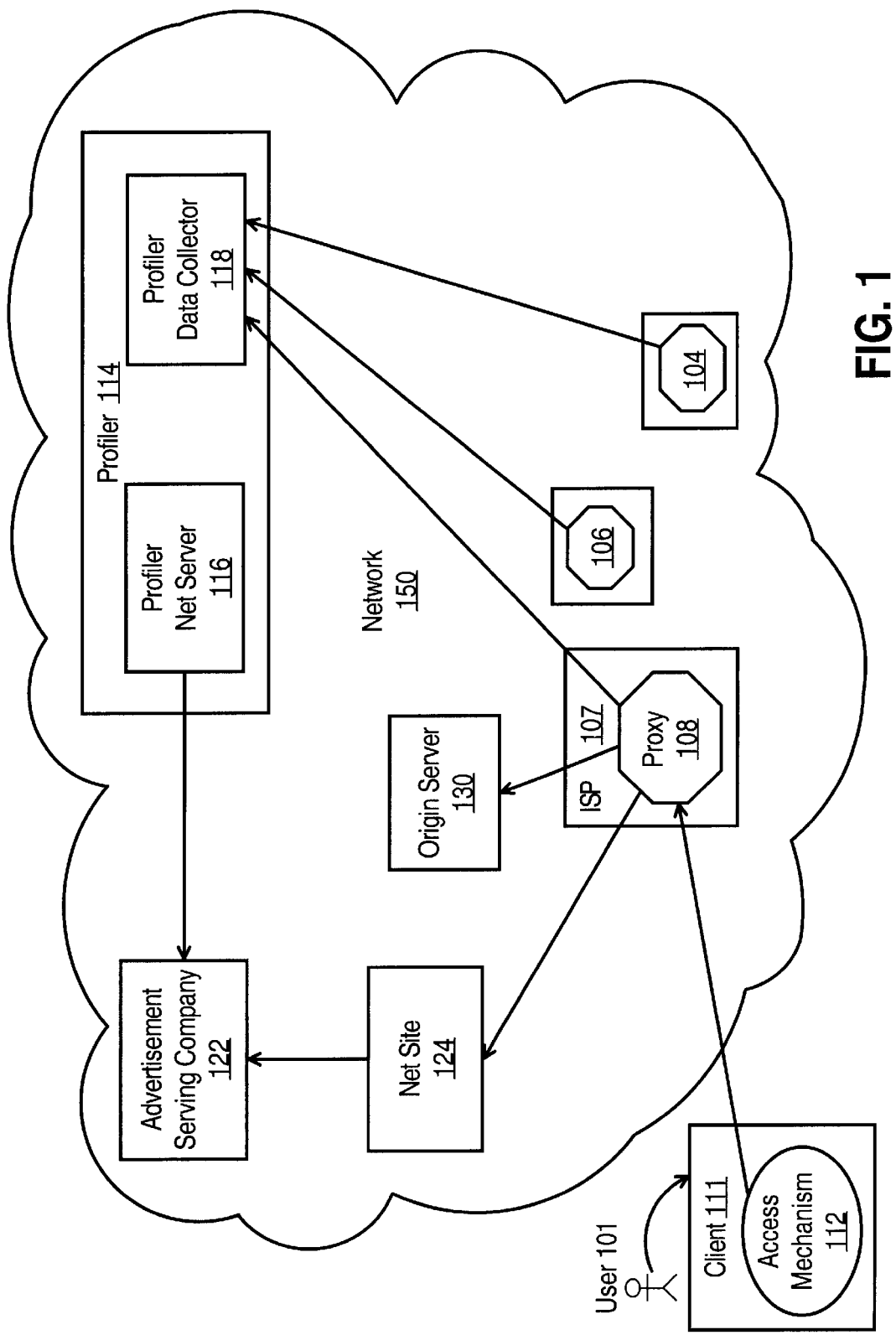
FIG. 1 is a block diagram of the general architecture of a user-specific usage data gathering system.

FIG. 1 is a block diagram of the general architecture of a user-specific usage data gathering system, according to an embodiment of the invention. A user 101 can access the Net through client 111, which is an end station of a network. Client 111 may be, for example, a mobile phone, palm-top device, TV or Cable set-top box, workstation or personal computer, executing a browser or other access mechanism 112. The access mechanism 112 is a software or hardware element that can request hypertext documents, applications, or other data from a server, interpret the source language in which the data or applications are written, and display the documents or data or allow the user to interact with the application. Examples of commercial products that are suitable for use as access mechanism 112 are Netscape Navigator, Microsoft Internet Explorer, Nokia or Sprint's Internet-enabled Cell Phone, WebTV's set-top box, or Palm Computing's device.

Access mechanism 112 is logically coupled to a network 150, which may be a local area network (LAN), wide area network (WAN), an internetwork, or a plurality of any of the foregoing. In the system illustrated in FIG. 1, network 150 is the Internet. An origin server 130, which manages a master copy of a document, data, or application (in this instance a hypertext document), is coupled to network 150. In turn, the network 150 is logically coupled to proxy 108.

Proxy 108 may be located, for example, at a computing facility of an Internet Service Provider (ISP) 107. Proxy 108 is part of Network 150. According to one embodiment, a user-specific data gathering system may comprise several proxies. For example, proxies 104 and 106, which are part of Network 150, are also part of the user-specific data gathering system. Similarly, one or more clients, each executing an access mechanism, may be logically coupled to each proxy.

User 101 is associated with client 111 and generates a request to retrieve electronic information, for example a Net file, according to a particular resource locator. For example, a Net access mechanism of the client may request a Net file using the URL associated with the Net file, such as "www.cnn.com/". Thus, access mechanism 112 submits the Net file request of user 101 to proxy 108.

Proxy 108 determines whether the requested Net file is in its associated cache. If it is, then proxy 108 delivers the requested Net file to the access mechanism 112 from the cache. If the requested Net file is not in the cache, a domain name service or similar network element is used to determine the location of the origin server that contains the requested file. When the location is determined, proxy 108 retrieves the Net file from the origin server 130, delivers the Net file to the client 111, and optionally stores the Net file in cache for use in handling subsequent requests. Thus, normally, all Net traffic directed to origin servers by user 101 is processed by the proxy 108.

Since most or all the Net traffic from a certain set of users passes through proxy 108, the proxy is in the best position to either collect user-specific usage information, or cause information to be collected, on each user whose requests for Net files either pass through proxy 108 or that are made directly to proxy 108, which may be acting on behalf of some content publisher.

According to one embodiment, techniques are provided that allow proxy 108 to collect (1) each user's URL request, (2) a time stamp indicating the time when the user visited the Net page represented by the URL, and (3) a corresponding unique user_id. The information collected by proxy 108 for a particular user is hereafter referred to as the user's user-specific usage data. The user-specific usage data for all users connected to a particular proxy is collectively referred to as the "clickstream data" for that proxy.

According to one embodiment, proxy 108 sends its clickstream data to a profiler 114 for "behavioral analysis". Specifically, proxy 108 opens a connection to the profiler 114 and continuously sends to the profiler 114 the clickstream data of all users being handled by proxy 108. According to one embodiment, there may be several profiling systems. Thus, proxies may send or "stream" their clickstream data to each of the profilers in the system, or otherwise have the profilers download or retrieve data from the proxies.

In an alternate embodiment, the proxy does not transmit the clickstream data in real-time. Rather, the proxy creates and stores one or more logs which contain clickstream data. Periodically, the proxy compresses the data in the logs and sends it to one or more profilers for analysis, or otherwise has the profilers download or retrieve data from the proxies. Whether the clickstream data is continuously streamed to the profilers or periodically sent to the profilers, the goal is to actively build a history of each user's actions on the Net over an indefinite period.

In another embodiment, the proxies may send clickstream data to a data warehouse where the data can be organized, manipulated and mined to produce useful knowledge of which behavioral analysis is only one aspect.

Profiler 114 includes a profiler data collector 118, and a profiler Net server 116. An advertisement serving company 122 may pay profiler 114 for useful knowledge on users. The advertisement serving company 122 could then buy advertising space within the electronic information. The electronic information may be manifested as various Net applications, data files, documents, or on various Net sites, such as Net site 124. Thus, if user 101 happens to visit Net site 124, advertisement serving company 122, armed with useful knowledge of user 01's Net interaction behavior, may present to user 101 selected advertisements based on user's 101 Net interaction behavior.

Identifying which User is Making a Request

As explained above, proxies may continuously stream clickstream data to one or more profilers, or in the alternate, send compressed or uncompressed data from logs that contain the clickstream data, or otherwise have the profilers download or retrieve data from the proxies. However, a given clickstream is useful only if it is possible to identify the separate user-specific usage information for each of the various users represented in the clickstream. For example, it is much more useful to know that a particular user has visited numerous golf sites than it is to know that a particular user is using a proxy through which someone, who may or may not have been the specific user, has accessed numerous golf sites. Thus, a mechanism is needed to identify the specific user that is associated with each of the requests that pass through the proxy, or that are made directly to the proxy.

Unfortunately, the requests that a proxy receives from users typically do not contain data that reliably identifies the users that are issuing the requests. For example, a request typically contains an IP address assigned to the user issuing the request. Frequently, however, that IP address is only assigned to a user for the duration of a session. In a subsequent session, the same user may be assigned a completely different IP address.

In one embodiment, a user tracking technique is used which involves (1) assigning a unique user_id to an access mechanism, and (2) compelling the access mechanism to send to the proxy the user_id each time the access mechanism requests any Net file on behalf of the user. As shall be described in greater detail hereafter, the proxy can create a unique user_id for a particular user and sends the unique user_id in a cookie or http header, or other accepted mechanism back to the user's access mechanism in response to the access mechanism's request for a Net file. This type of cookie or http header, or other accepted mechanism is hereafter referred to as an "identifier".

Cookies are a general mechanism that Netservers can use to both store and receive information on clients in a Net based client-server architecture. For example, cookies may contain the user's preferences associated with a particular Net site. The access mechanism automatically sends a cookie associated with a particular Net site when the access mechanism requests a Net file from that Net site. For example, when a user visits "www.mysite.com", the server that manages that site may ask for the name of the user. When the server receives the name of the user, the server may send a cookie that contains the name back to the access mechanism. Every subsequent time the user visits that same site, the access mechanism will automatically send the cookie information to the server, thus automatically communicating the user's name to the server.

However, for security reasons, a cookie placed by one site is never sent to any site other than the site that placed the cookie. Consequently, novel techniques have been developed to enable the proxy to receive user_id identifiers in response to all requests issued by users, regardless of the site requested.

According to one embodiment, the proxy compels the access mechanism to send its proxy user_id identifier to the proxy in response to every request by inserting a reference to a "marker item" in every Net page delivered to the access mechanism. The marker item is an item managed by the proxy. In response to receiving the Net page that contains the reference to the marker item, the access mechanism issues a request to retrieve the marker item. Because the request to retrieve the marker item is for an item stored at the site that placed the proxy user_id identifier, the access mechanism automatically sends the proxy user_id identifier to the proxy along with the request for the marker item.

In one embodiment, the marker item is a one-pixel image stored in the proxy in graphics interchange format or in joint photographic expert group format. When the access mechanism attempts to retrieve the one-pixel image from the proxy site, the access mechanism will automatically submit the proxy user_id identifier. The proxy uses the proxy user_id identifier for tracking the user's actions on the Net.

First phase of Cookie ("Identifier") Exchange

Figure 2:
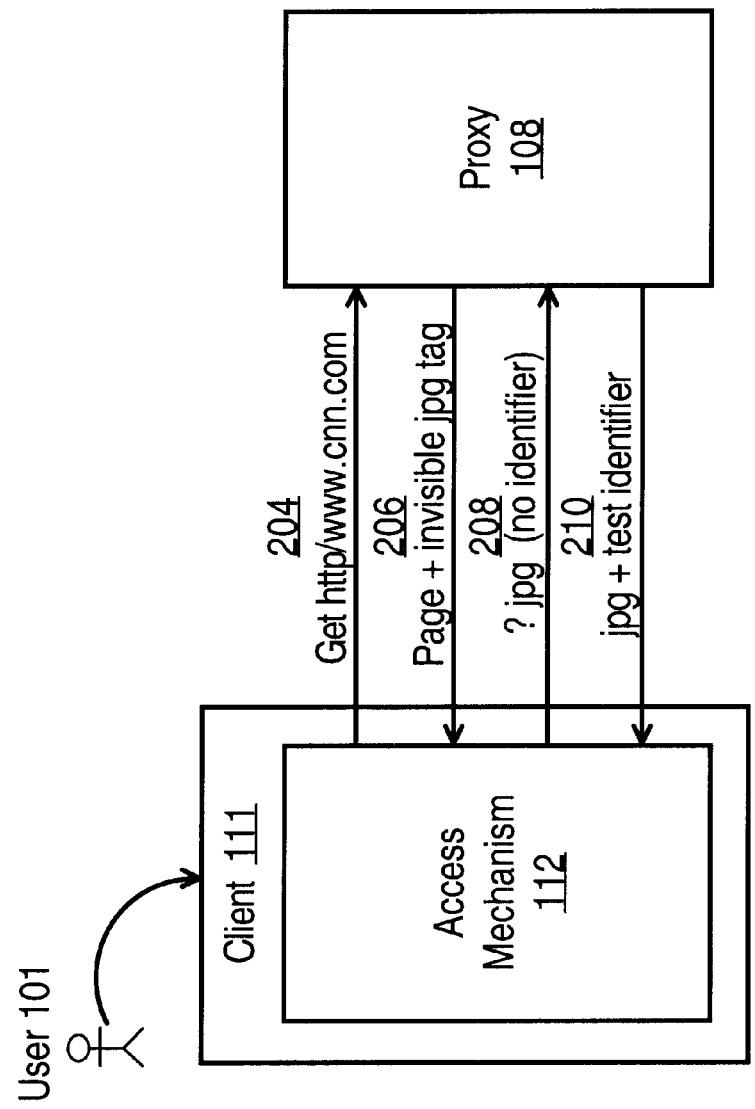
FIG. 2 is a block diagram illustrating the first phase of a cookie exchange.

According to one embodiment, the proxy places a proxy user_id identifier in the manner illustrated in FIG. 2. Referring to FIG. 2, it is a block diagram illustrating the first phase of a cookie (identifier) exchange between proxy 108 and access mechanism 112. In FIG. 2, user 101 is associated with client 111, in which Net access mechanism 112 executes. Assume that user 101 submits a request for a Net file from CNN's Net site using client 111. Assume that the requested Net file is "www.cnn.com/pageone.html" Access mechanism 112, executing in client 111, sends the request for "www.cnn.com/pageone.html" to proxy 108 as indicated by arrow 204 in FIG. 2. As indicated by arrow 206, the proxy returns the Net page that corresponds to the address "www.cnn.com/pageone.html", but not before inserting into the Net page a reference to an invisible one-pixel image stored in the proxy. Assume that the reference to the invisible one-pixel image is represented by "www.tracking.com/1pixel.jpg".

When access mechanism 112 receives the CNN Net file, access mechanism 112 will see that the 1pixel.jpg reference is part of the CNN Net file and, in response, access mechanism 112 will request from proxy 108, the "tracking.com/1pixel.jpg", as indicated by arrow 208. At this point, no proxy user_id identifier has been placed on client 111. Consequently, the request for 1pixel.jpg will not include any identifier information.

When proxy 108 receives the above request, indicated by arrow 208, the proxy realizes that access mechanism 112 did not offer an identifier along with its request for the 1pixel.jpg. Thus, proxy 108 is on notice that user 101 is a first time user, or a user whose identifier information has become lost or invalid. In response, proxy 108 will send to access mechanism 112, as indicated by arrow 210, a test identifier along with the requested 1pixel.jpg. The purpose of the test identifier is to test whether access mechanism 112 accepts identifiers at all.

The first phase of the cookie (identifier) exchange may be summarized by the following exchange between a first time user's access mechanism and the proxy:

Access mechanism: "Get www.cnn.com/pageone.html"

Proxy: "Here is www.cnn.com/pageone.html+tracking.com/1pixel.jpg"

Access mechanism: "I now see a .jpg reference as part of the cnn.com page, so get tracking.com/1pixel.jpg".

Proxy: "Here is tracking.com/1pixel.jpg. +a test identifier"

Second Phase of Cookie (Identifier) Exchange

Figure 3:
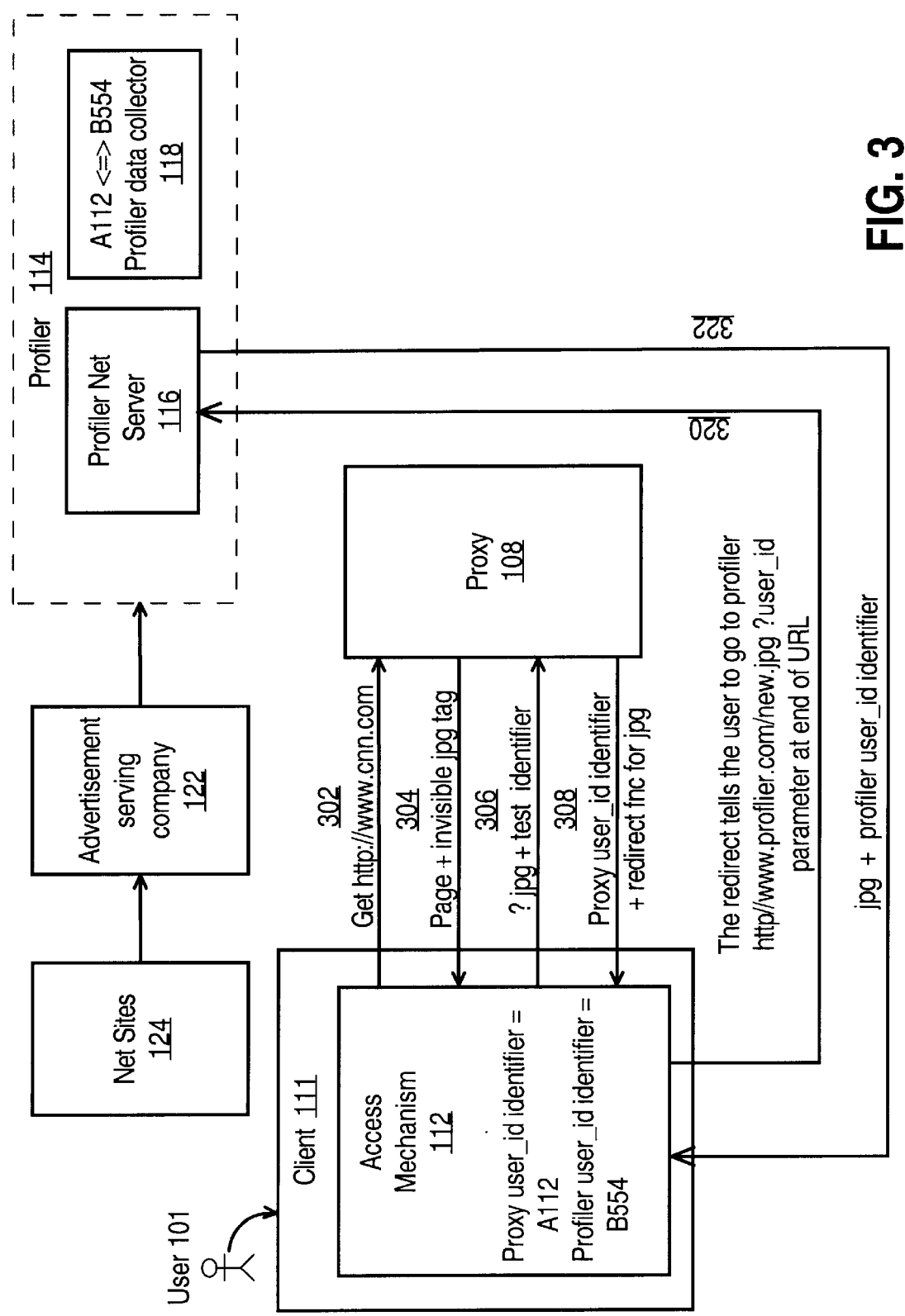
FIG. 3 is a block diagram illustrating the second phase of a cookie exchange.

Assume user 101 once again uses access mechanism 112 on client 111 to request another Net file from cnn.com, namely, "www.cnn.com/pagetwo.html", as indicated by arrow 302 in FIG. 3. This second request may occur during the same session as the first request, or in a subsequent session. Consequently, the IP address of the user may have changed. In response to the request, proxy 108 sends to access mechanism 112 "www.cnn.com/pagetwo.html" but not before inserting a reference to the invisible one-pixel image, "www.tracking.com/1pixel.jpg", as indicated by arrow 304.

When access mechanism 112 receives the CNN Net file, access mechanism 112 will see that the 1pixel.jpg reference is part of the CNN Net file and in response, access mechanism 112 will request from proxy 108, the "tracking.com/1pixel.jpg/", as indicated by arrow 306. However, unlike the first phase of the cookie (identifier) exchange, access mechanism 112 sends with its request for the 1pixel.jpg the test identifier that it received during the first phase cookie (identifier) exchange.

When proxy 108 receives the test identifier, proxy then knows that access mechanism 112 is able to accept identifiers. Thus, proxy 108 creates a unique user_id for user 101 and sends a proxy user_id identifier that contains the user_id to access mechanism 112, as indicated by arrow 308. Consequently, in all subsequent requests issued by access mechanism 112, a reference to the marker item will be placed in the delivered files, and access mechanism 112 will respond to the reference by sending the proxy user_id identifier to proxy 108.

Establishing Correlation Between Proxy User_id and Profiler User_id

The user-specific usage data gathered by the proxy organizes the usage data based on proxy user_id. However, when a user visits a third-party Net site, the proxy user_id identifier will not be sent to the Net site because, as mentioned above, access mechanisms only send identifiers to the sites that placed them. Consequently, the user-specific usage data gathered by the proxy 108 is only useful to the third-party Net site if the third-party Net site is able to determine that a user visiting the Net site corresponds to a particular proxy user_id. Thus, a novel technique is provided that allows third-party Net sites to establish correlation between user _ids that they assign to users (using their own identifiers), and the proxy user_ids.

According to one embodiment, in addition to sending a proxy user_id identifier to an access mechanism, the proxy sends a redirect function to the access mechanism 112. The redirect function redirects access mechanism 112 to get the 1pixel.jpg image from profiler Net server 116, as indicated by arrow 320. The redirect function sent to the access mechanism 112 includes a parameter that identifies the proxy user_id that was just created by proxy 108 for user 101, and assigned to user 101 using the proxy identifier. For example, the redirect function may be represented as, "www.profiler.com/1pixel.jpg?user_id".

In response to the redirect, access mechanism 112 issues a request for 1pixel.jpg from the profile Net server. The request sent to the profile Net server 116 in response to the redirect includes the proxy user_id value. In response to the request, profiler Net server 116 (1) creates a profiler user_id, (2) stores data indicating the correlation between the profiler user_id and the proxy user_id, and (3) sends the requested 1pixel.jpg to access mechanism 112 with a profiler user_id identifier. The transmission of the 1pixel.jpg and profiler user_id identifier is indicated by arrow 322.

The profiler user_id thus assigned will be included with all future requests received by profiler Net server 116 from access mechanism 112. Based on the profiler user_id contained in those subsequent requests, the profiler 114 identifies the corresponding proxy user_id. Having identified the corresponding proxy user_id, the profiler 114 knows which user-specific usage data corresponds to the user that issued the request, and is therefore able to serve advertisements to user 101 based on the interests reflected in that user-specific usage data.

The second phase of the cookie (identifier) exchange may be summarized by the following exchange between the user's access mechanism and the proxy:

Access mechanism: "Get www.cnn.com/pagetwo.html"
Proxy: "Here is www.cnn.com/pagetwo.html+tracking.com/1pixel.jpg"
Access mechanism: "I now see a .gif reference as part of the cnn.com page, so get tracking.com/1pixel.jpg, and here is your test identifier".
Proxy: "I see the test identifier so I now know that you accept identifiers. Here is a redirect to profiler.com/1pixel.jpg?user_id+a proxy user_id identifier"
Access mechanism: "I accept your identifier and see your redirect, so get profiler.com/1pixel.jpg?user_id"
Profiler Net server: "Here is a profiler.com/1pixel.jpg+a profiler user_id identifier"

Generation and Collection of User-Specific Usage Data

Figure 4:
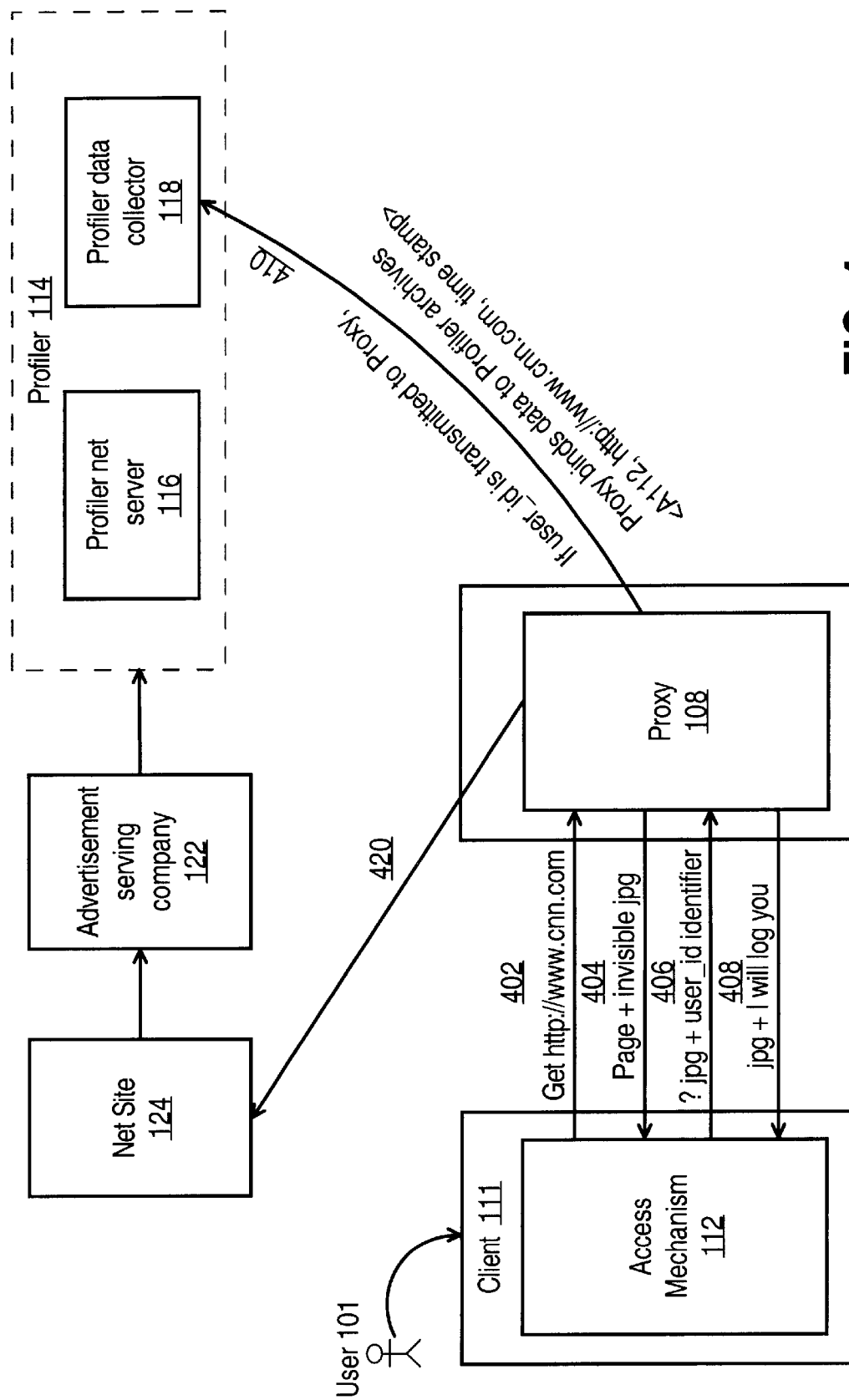
FIG. 4 is a block diagram illustrating a phase subsequent to the second phase of a cookie exchange.

Assume that, subsequent to the placement of the profiler identifier, user 101, through access mechanism 112 requests yet another Net file from cnn.com, namely, "www.cnn.com/pagethree.html", as indicated by arrow 402 in FIG. 4. This request may occur in the same session as the session during which the profiler identifier was placed, or in a later session. In response to the request, proxy 108 sends to access mechanism 112 the Net page associated with the address "www.cnn.com/pagethree.html", but not before inserting a reference to an invisible one-pixel image, "www.tracking.com/1pixel.jpg", as indicated by arrow 404.

When access mechanism 112 receives the CNN Net file, access mechanism 112 will see that the 1pixel.jpg reference is part of the CNN Net file and in response, access mechanism 112 will request from proxy 108, the "tracking.com/1pixel.jpg/", as indicated by arrow 406. However, unlike the second phase of the cookie (identifier) exchange, access mechanism 112 sends the proxy user_id identifier, that it received during the second phase of cookie (identifier) exchange, with its request for the 1pixel.jpg.

In response to receiving the proxy user_id identifier, proxy 108 generates a user-specific usage record. According to one embodiment, the user-specific usage record contains:

(1) the proxy user_id contained in the cookie or identifier
(2) data identifying the page delivered to the user, and
(3) a timestamp indicating the time at which the Net page was delivered to the user The proxy knows the identity of the page that was delivered to the user (the just-delivered page that contained the reference that caused the 1pixel.jpg request) because the identity of the page is included as the "referencing page" in the access mechanism's request for 1pixel.jpg. After the user-specific usage record is generated, it is sent to profiler data collector 118. In one embodiment, the record is sent in real time within proxy 108's clickstream to profiler data collector 118. In an alternative embodiment, proxy 108 logs the record and periodically sends the logged data to profiler data collector 1118, as indicated by arrow 410.

When the record reaches profiler data collector 1118, the record is stored with any previously-gathered user-specific usage data for user 101. All records pertaining to the same user are identified based on the proxy user_associated with the user.

All phases subsequent to the second phase of the cookie (identifier) exchange may be summarized by the following imaginary exchange between the user's access mechanism and the proxy:

Access mechanism: "Get www.cnn.com/pagethree.html"

Proxy: "Here is www.cnn.com/pagethree.html+tracking.com/1pixel.jpg"

Access mechanism: "I now see a .jpg reference as part of the cnn.com page, so get tracking.com/1pixel.jpg, and here is your proxy user_id identifier".

Proxy: "I see the proxy user_id identifier so I will now commence to log your clickstream or I can continuously stream your clickstream up to the Profiler.

While the process of generating user-specific usage records has been explained with reference to a single user, it should be understood that a single proxy may be concurrently generating such records for all users that are issuing requests through the proxy. Consequently, the clickstream delivered by proxy 108 to profiler data collector 118 may constitute a relatively heavy and steady flow of data.

Further, any number of proxies may concurrently feed a single profiler 114. Each such proxy sends to profiler 118 a clickstream containing the user-specific usage data for those users that are connected to the network through the proxy. Similarly, the system may include any number of profilers, where each proxy sends its clickstream concurrently to each of the profilers.

Use of User-Specific Usage Data

The user-specific usage data that is collected using the techniques described above may be used in a variety of ways. One significant use of the user-specific usage data involves the delivery of advertisements to specifically targeted audiences. For example, a Net server may be responsible for displaying advertisements for numerous sponsors. If a Net server is able to determine the user-specific usage data for a visitor of the site, the server can select the specific advertisement to deliver to the visitor based on the interests reflected in the user-specific usage data.

For example, referring to FIG. 4, an advertisement serving company 122 may be connected to profiler 114 and may have access to the user-specific usage data collected on profiler data collector 118. Advertisement serving company 122 pays cnn.com for advertising space on a Net page provided by cnn.com. When proxy 108 retrieves http://www.cnn.com/pagethree.html from the CNN Net server, the Net page includes a reference to profiler Net server 116. The access mechanism 112 responds to the reference by sending a request to profiler Net server 116. The profiler user_id identifier is sent from access mechanism 112 to profiler Net server 116 along with the request.

Upon receiving the request and accompanying profiler user_id, the profiler Net server 116 inspects the stored user-specific usage data for the user that issued the request. Profiler Net server 116 then selects an advertisement based on the interests reflected by that user-specific usage data, and transmits the advertisement to access mechanism 112 in response to the request. The advertisement is displayed by access mechanism 112 as part of the Net page from cnn.com.

Hardware Overview

Figure 5:
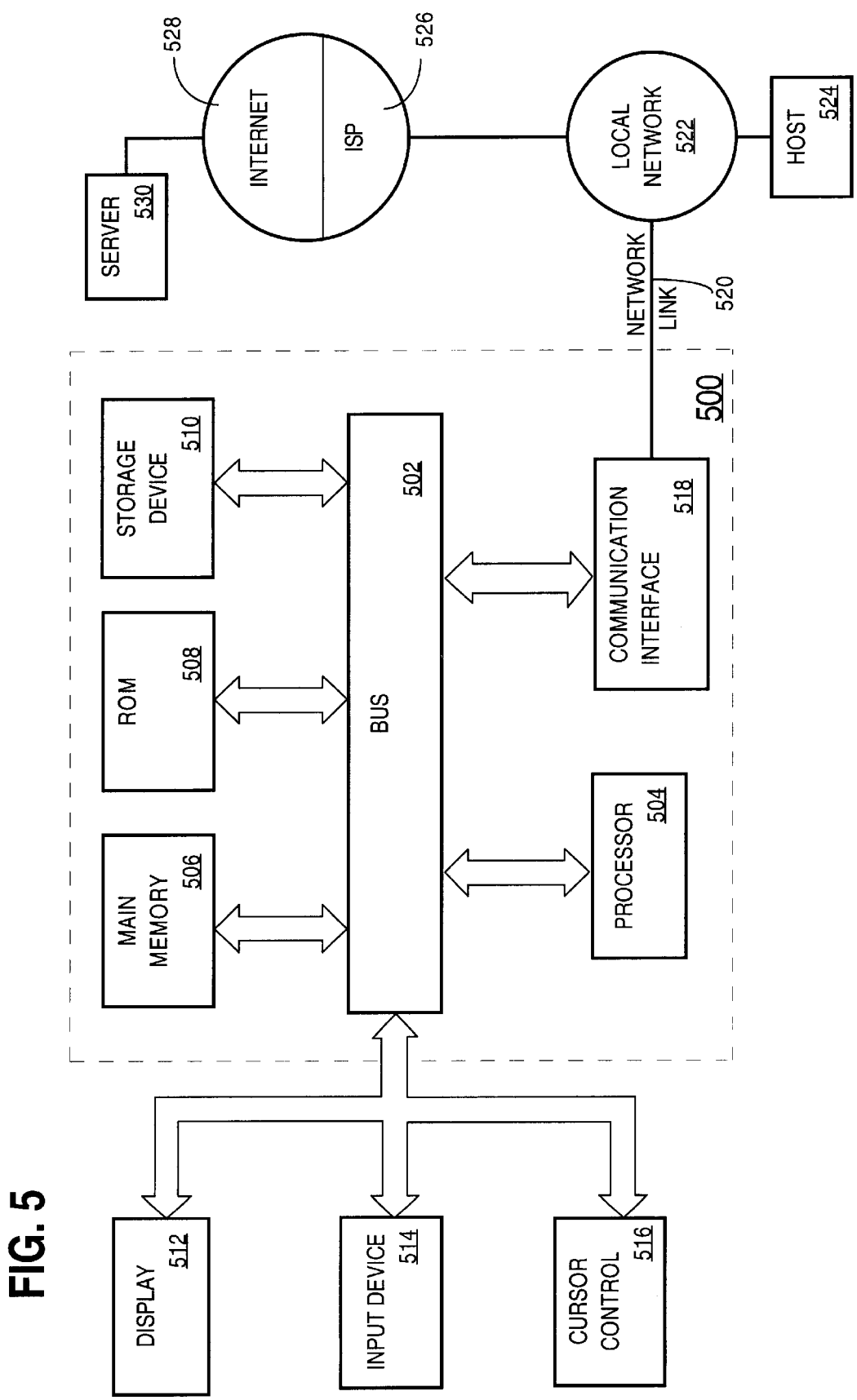
FIG. 5 is a block diagram of a computer system hardware arrangement that may be used to implement aspects of an embodiment.

FIG. 5 is a block diagram that illustrates a computer system 500 upon which an embodiment of the invention may be implemented.

Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for managing changes to a directory of electronic files. According to one embodiment of the invention, managing changes to a directory of electronic files is provided by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518. In accordance with the invention, one such downloaded application provides for managing changes to a directory of electronic files as described herein.

The received code may be executed by processor 504 as it is received, and/or stored in storage device 510, or other non-volatile storage for later execution. In this manner, computer system 500 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of capturing user-specific usage data of one or more users, the method comprising the steps of:

using a proxy, through which the one or more users send messages to addresses associated with a plurality of other servers on a network, to continuously generate records that indicate the servers to which each of the one or more users sends messages;

generating user-specific usage data based on the records;

causing the proxy to open a connection to a first server on the network;

streaming the user-specific usage data over the connection to the first server; and storing the user-specific usage data at the first server.

2. The method of claim 1 further comprising the steps of:

causing the proxy to open a second connection to a second server on the network;

streaming the user-specific usage data over the connection to the second server; and wherein the step of storing the user-specific usage data includes storing the user-specific usage data at the second server.

3. The method of claim 1 wherein the step of streaming the user-specific usage data over the connection to the first server includes sending the user-specific usage data to the first server in real-time as the records are generated.

4. The method of claim 1 wherein the step of streaming the user-specific usage data over the connection to the first server includes storing the user-specific usage data at the proxy and sending the user-specific usage data to the first server in batches.

5. The method of claim 1 further comprising the steps of:

causing the proxy to open a connection to a first server on the network;

downloading the user-specific usage data over the connection to the first server; and wherein the step of storing the user-specific usage data includes storing the user-specific usage data at the first server.

6. The method of claim 5 further comprising the steps of:

causing the proxy to open a second connection to a second server on the network;

downloading the user-specific usage data over the connection to the second server; and wherein the step of storing the user-specific usage data includes storing the user-specific usage data at the second server.

7. The method of claim 5 wherein the step of downloading the user-specific usage data over the connection to the first server includes causing the first server to retrieve in real-time from the proxy the user-specific usage data as the records are generated.

8. The method of claim 5 wherein the step of downloading the user-specific usage data over the connection to the first server includes storing the user-specific usage data at the proxy and causing the first server to retrieve the user-specific usage data in batches.

9. The method of claim 1 further comprising the steps of:

using a second proxy, through which a second set of one or more users send messages to addresses associated with the plurality of other servers on the network, to continuously generate records that indicate the addresses to which each user in the second set of the one or more users sends messages;

generating a second set of user-specific usage data based on the records;

causing the second proxy to open a second connection to a first server on the network;

streaming the second set of user-specific usage data over the second connection to the first server; and storing the second set of user-specific usage data at the first server.

10. The method of claim 9 wherein the step of streaming the second set of user-specific usage data over the second connection to the first server includes sending the second set of user-specific usage data to the first server in real-time as the records are generated.

11. The method of claim 9 wherein the step of streaming the second set of user-specific usage data over the second connection to the first server includes storing the second set of user-specific usage data at the second proxy and sending the second set of user-specific usage data to the first server in batches.

12. The method of claim 9 further comprising the step of downloading the second set of user-specific usage data over the second connection to the first server.

13. The method of claim 12 wherein the step of downloading includes causing the first server to retrieve in real-time from the second proxy the second set of user-specific usage data as the records are generated.

14. The method of claim 12 wherein the step of downloading includes storing the second set of user-specific usage data at the second proxy and causing the first server to retrieve the second set of user-specific usage data in batches.

15. The method of claim 1 wherein:
the proxy maintains a cache of previously-requested electronic information; and
when a message that is addressed to one of the other servers on the network requests any previously-requested electronic information stored in the cache, the proxy delivers the previously-requested electronic information to the user from the cache without forwarding the message to the one of the other servers.

16. The method of claim 15 wherein electronic information comprises documents, files, data, and application components.

17. The method of claim 1 further comprising the steps of:
associating each user of the one or more users with a unique user_id; and
associating the user-specific usage data generated for each user with the unique user_id of the user.

18. The method as recited in claim 17, wherein the step of associating each user with a unique user_id comprises the steps of:
inserting references to a marker item into electronic information requested by the one or more users;
in response to a decoding operation performed on the references, receiving requests from the one or more users for the marker item; and
in response to requests for the marker item, assigning user_ids to users that have not already been assigned user ids.

19. The method as recited in claim 18 further comprises sending to each user a test identifier when that user did not offer a proxy user_id identifier along with that user's request for the electronic information.

20. The method of claim 19 wherein electronic information comprises documents, files, data, and application components.

21. The method as recited in claim 18 wherein the step of assigning user_ids to users that have not already been assigned user_ids comprises:
if the request for the marker item does not include any identifier, then sending to the user that issued the request a test identifier;
if the request for the marker item includes the test identifier, then sending to the user that issued the request a proxy user_id identifier.

22. The method as recited in claim 18, further comprises:
sending to each user a proxy user_id identifier, wherein the proxy user_id identifier contains the unique user_id for that user, when that user offers a test identifier along with a request for the marker item; and
redirecting that user to a profiler to receive a profiler user_id identifier.

23. The method as recited in claim 1, wherein:
the messages include requests for electronic information;
the user-specific usage data includes
uniform resource locators of the electronic information requested by each user, and
a time stamp indicating when each user requested the electronic information.

24. The method as recited in claim 1, wherein:
the messages include requests for Net pages;
the user-specific usage data includes
uniform resource locators of the net pages requested by each user, and
a time stamp indicating when each user requested the net pages.

25. The method as recited in claim 1, further comprises generating a record that indicates that a user requested particular electronic information in response to that user offering a proxy user_id identifier along with a request for a marker item, wherein the request for the marker item was issued in response to a reference to the marker item in the particular electronic information.

26. The method of claim 25 wherein electronic information comprises documents, files, data, and application components.

27. The method as recited in claim 1, further comprising customizing contents of electronic information delivered to a particular user based on the user-specific usage data generated for that user.

28. The method as recited in claim 1, further comprises using the user-specific usage data generated for the one or more users to identify Net sites that represent complementary products and services.

29. The method as recited in claim 27, wherein the step of customizing contents of electronic information delivered to a particular user comprises sending to the particular user an advertisement targeted at the particular user.

30. The method of claim 29 wherein electronic information comprises documents, files, data, and application components.

31. A computer-readable medium carrying one or more sequences of one or more instructions for capturing user-specific usage data of one or more users, the one or more sequences of one or more instructions including instructions which, when executed by one or more processors, cause the one or more processors to perform the steps of:
using a proxy, through which the one or more users send messages to addresses associated with a plurality of other servers on a network, to continuously generate records that indicate the servers to which each of the one or more users sends messages;
generating user-specific usage data based on the records;
causing the proxy to open a connection to a first server on the network;
streaming the user-specific usage data over the connection to the first server; and
storing the user-specific usage data at the first server.

32. The computer-readable medium of claim 31 further comprising the steps of:

causing the proxy to open a second connection to a second server on the network;

streaming the user-specific usage data over the connection to the second server; and wherein the step of storing the user-specific usage data includes storing the user-specific usage data at the second server.

33. The computer-readable medium of claim 31 wherein the step of streaming the user-specific usage data over the connection to the first server includes sending the user-specific usage data to the first server in real-time as the records are generated.

34. The computer-readable medium of claim 31 wherein the step of streaming the user-specific usage data over the connection to the first server includes storing the user-specific usage data at the proxy and sending the user-specific usage data to the first server in batches.

35. The computer-readable medium of claim 31 further comprising the steps of:

causing the proxy to open a connection to a first server on the network;

downloading the user-specific usage data over the connection to the first server; and wherein the step of storing the user-specific usage data includes storing the user-specific usage data at the first server.

36. The computer-readable medium of claim 35 further comprising the steps of:

causing the proxy to open a second connection to a second server on the network;

downloading the user-specific usage data over the connection to the second server; and wherein the step of storing the user-specific usage data includes storing the user-specific usage data at the second server.

37. The computer-readable medium of claim 35 wherein the step of downloading the user-specific usage data over the connection to the first server includes causing the first server to retrieve in real-time from the proxy the user-specific usage data as the records are generated.

38. The computer-readable medium of claim 35 wherein the step of downloading the user-specific usage data over the connection to the first server includes storing the user-specific usage data at the proxy and causing the first server to retrieve the user-specific usage data in batches.

39. The computer-readable medium of claim 31 further comprising the steps of:

using a second proxy, through which a second set of one or more users send messages to addresses associated with the plurality of other servers on the network, to continuously generate records that indicate the addresses to which each user in the second set of the one or more users sends messages;

generating a second set of user-specific usage data based on the records;

causing the second proxy to open a second connection to a first server on the network;

streaming the second set of user-specific usage data over the second connection to the first server; and storing the second set of user-specific usage data at the first server.

40. The computer-readable medium of claim 39 wherein the step of streaming the second set of user-specific usage data over the second connection to the first server includes sending the second set of user-specific usage data to the first server in real-time as the records are generated.

41. The computer-readable medium of claim 39 wherein the step of streaming the second set of user-specific usage data over the second connection to the first server includes storing the second set of user-specific usage data at the second proxy and sending the second set of user-specific usage data to the first server in batches.

42. The computer-readable medium of claim 39 further comprising the step of downloading the second set of user-specific usage data over the second connection to the first server.

43. The computer-readable medium of claim 42 wherein the step of downloading includes causing the first server to retrieve in real-time from the second proxy the second set of user-specific usage data as the records are generated.

44. The computer-readable medium of claim 42 wherein the step of downloading includes storing the second set of user-specific usage data at the second proxy and causing the first server to retrieve the second set of user-specific usage data in batches.

45. The computer-readable medium of claim 31 wherein:

the proxy maintains a cache of previously-requested electronic information; and when a message that is addressed to one of the other servers on the network requests any previously-requested electronic information stored in the cache, the proxy delivers the previously-requested electronic information to the user from the cache without forwarding the message to the one of the other servers.

46. The computer-readable medium of claim 45 wherein electronic information comprises documents, files, data, and application components.

47. The computer-readable medium of claim 31 further comprising the steps of:

associating each user of the one or more users with a unique user_id; and associating the user-specific usage data generated for each user with the unique user_id of the user.

48. The computer-readable medium as recited in claim 47, wherein the step of associating each user with a unique user_id comprises the steps of:

inserting references to a marker item into electronic information requested by the one or more users;

in response to a decoding operation performed on the references, receiving requests from the one or more users for the marker item; and in response to requests for the marker item, assigning user_ids to users that have not already been assigned user_ids.

49. The computer-readable medium as recited in claim 48, further comprises sending to each user a test identifier when that user did not offer a proxy user_id identifier along with that user's request for the electronic information.

50. The computer-readable medium of claim 49 wherein electronic information comprises documents, files, data, and application components.

51. The computer-readable medium as recited in claim 48, wherein the step of assigning user_ids to users that have not already been assigned user_ids comprises:

if the request for the marker item does not include any identifier, then sending to the user that issued the request a test identifier;

if the request for the marker item includes the test identifier, then sending to the user that issued the request a proxy user_id identifier.

52. The computer-readable medium as recited in claim 48, further comprises:

sending to each user a proxy user_id identifier, wherein the proxy user_id identifier contains the unique user_id for that user, when that user offers a test identifier along with a request for the marker item; and redirecting that user to a profiler to receive a profiler user_id identifier.

53. The computer-readable medium as recited in claim 31 wherein:

the messages include requests for electronic information;

the user-specific usage data includes uniform resource locators of the electronic information requested by each user, and a time stamp indicating when each user requested the electronic information.

54. The computer-readable medium as recited in claim 31 wherein:

the messages include requests for Net pages;

the user-specific usage data includes uniform resource locators of the net pages requested by each user, and a time stamp indicating when each user requested the net pages.

55. The computer-readable medium as recited in claim 31, further comprises generating a record that indicates that a user requested particular electronic information in response to that user offering a proxy user_id identifier along with a request for a marker item, wherein the request for the marker item was issued in response to a reference to the marker item in the particular electronic information.

56. The computer-readable medium of claim 55 wherein electronic information comprises documents, files, data, and application components.

57. The computer-readable medium as recited in claim 31, further comprising customizing contents of electronic information delivered to a particular user based on the user-specific usage data generated for that user.

58. The computer-readable medium as recited in claim 57, wherein the step of customizing contents of electronic information delivered to a particular user comprises sending to the particular user an advertisement targeted at the particular user.

59. The computer-readable medium of claim 58 wherein electronic information comprises documents, files, data, and application components.

60. The computer-readable medium as recited in claim 31, further comprises using the user-specific usage data generated for the one or more users to identify Net sites that represent complementary products and services.

61. A method of identifying which electronic information is being requested by each user of a plurality of users that are requesting electronic information through a proxy, the method comprising the steps of:

inserting a reference to a marker item into electronic information delivered to a user of the plurality of users;

receiving a request for the marker item in response to the user receiving the reference;

if the request is accompanied by a proxy user_id, then storing data to indicate that the user requested the electronic information;

if the request is not accompanied by the proxy user_id, then responding to the request by sending an identifier to the user.

62. The method of claim 61 wherein electronic information comprises documents, files, data, and application components.

63. The method of claim 61 wherein:

the step of sending the identifier includes sending a test identifier;

the method further includes the steps of:

determining whether the request is accompanied by the test identifier; and if the request is accompanied by the test identifier, then sending a proxy identifier that includes the proxy user_id to the user.

64. A computer-readable medium carrying one or more sequences of one or more instructions for establishing an association between a first set of user_ids assigned by a first server and a second set of user_ids assigned by a second server, the one or more sequences of one or more instructions including instructions which, when executed by one or more processors, cause the one or more processors to perform the steps of:

receiving a first request from a user for an item at the first server;

responding to the first request by performing the steps of sending a first identifier that contains a first user_id to the user; and sending a redirect command to cause the user to send a second request to the second server, wherein the redirect command includes the first user_id;

receiving the second request from the user at the second server;

responding to the second request by performing the steps of reading the first user_id from the second request;

storing data that establishes the association between the first user_id and a second user_id; and sending a second identifier that contains the second user_id to the user.

65. The computer-readable medium of claim 64 further comprising the step of causing the user to request the item by placing a reference to the item in electronic information requested by the user prior to delivering the electronic information to the user.

66. The computer-readable medium of claim 65, wherein electronic information comprises documents, files, data, and application components.

67. A method for establishing an association between a first set of user_ids assigned by a first server and a second set of user_ids assigned by a second server, the method comprising the steps of:

receiving a first request from a user for an item at the first server;

responding to the first request by performing the steps of sending a first identifier that contains a first user_id to the user; and sending a redirect command to cause the user to send a second request to the second server, wherein the redirect command includes the first user_id;

receiving the second request from the user at the second server;

responding to the second request by performing the steps of reading the first user_id from the second request;

storing data that establishes the association between the first user_id and a second user_id; and sending a second identifier that contains the second user_id to the user.

68. The method of claim 67 further comprising the step of causing the user to request the item by placing a reference to the item in electronic information requested by the user prior to delivering the electronic information to the user.

69. The method of claim 68 wherein electronic information comprises documents, files, data, and application components.

70. A computer-readable medium carrying one or more sequences of one or more instructions for identifying which electronic information is being requested by each user of a plurality of users that are requesting electronic information through a proxy, the one or more sequences of one or more instructions including instructions which, when executed by one or more processors, cause the one or more processors to perform the steps of:

inserting a reference to a marker item into electronic information delivered to a user of the plurality of users;

receiving a request for the marker item in response to the user receiving the reference;

if the request is accompanied by a proxy user_id, then storing data to indicate that the user requested the electronic information;

if the request is not accompanied by the proxy user_id, then responding to the request by sending an identifier to the user.

71. The computer-readable medium of claim 70 wherein electronic information comprises documents, files, data, and application components.

72. The computer-readable medium of claim 70 wherein:

the step of sending the identifier includes sending a test identifier;

the method further includes the steps of:

determining whether the request is accompanied by the test identifier; and if the request is accompanied by the test identifier, then sending a proxy identifier that includes the proxy user_id to the user.

\* \* \* \* \*

UNITED STATES PATENT AND TRADEMARK OFFICE
CERTIFICATE OF CORRECTION

PATENT NO. : 6,993,590 B1
DATED : January 31, 2006
INVENTOR(S) : Paul Andre Gauthier et al.

It is certified that error appears in the above-identified patent and that said Letters Patent is hereby corrected as shown below:

Column 13,
Line 51, delete "user ids" and insert -- user_ids --.
Lines 52 and 59, delete "claim 18" and insert -- claim 18, --.

Column 17,
Lines 7 and 15, delete "claim 31" and insert -- claim 31, --.
Lines 59-64, delete "if the request is accompanied by a proxy user_id, then storing data to indicate that the user requested the electronic information,
if the request is not accompanied by the proxy user_id, then responding to the request by sending an identifier to the user." and insert -- determining that the request is accompanied by a proxy user_id; and in response to detecting that the request is accompanied by the proxy user_id, storing data to indicate that the user requested the electronic information. --.

Column 18,
Lines 24-27, delete "sending a redirect command to cause the user to send a second request to the
second server, wherein the redirect command includes the first user_id;" and insert
-- sending a redirect command to cause the user to send a second request to the second server, wherein the redirect command includes the first user_id; --.

Column 20,
Lines 1-6, delete "if the request is accompanied by a proxy user_id, then storing data to indicate that the user requested the electronic information; if the request is not accompanied by the proxy user_id, then responding to the request by sending an identifier to the user.".

UNITED STATES PATENT AND TRADEMARK OFFICE
CERTIFICATE OF CORRECTION

PATENT NO. : 6,993,590 B1
DATED : January 31, 2006
INVENTOR(S) : Paul Andre Gauthier et al.

It is certified that error appears in the above-identified patent and that said Letters Patent is hereby corrected as shown below:

<u>Column 20 (cont'd),</u>
and insert -- determining that the request is accompanied by a proxy user_id; and in response to detecting that the request is accompanied by the proxy user_id, storing data to indicate that the user requested the electronic information. --.

Signed and Sealed this

Twenty-fifth Day of April, 2006

JON W. DUDAS
*Director of the United States Patent and Trademark Office*